INVENTOR.
DONALD W. MORRIS
BY
Mellin and Hanscom
ATTORNEYS

Jan. 17, 1956 D. W. MORRIS 2,731,003
INTERNAL-COMBUSTION ENGINE
Filed Feb. 23, 1952 4 Sheets-Sheet 2

INVENTOR.
DONALD W. MORRIS
BY
Mellin and Hanscom
ATTORNEYS

Jan. 17, 1956 D. W. MORRIS 2,731,003
INTERNAL-COMBUSTION ENGINE
Filed Feb. 23, 1952 4 Sheets-Sheet 3
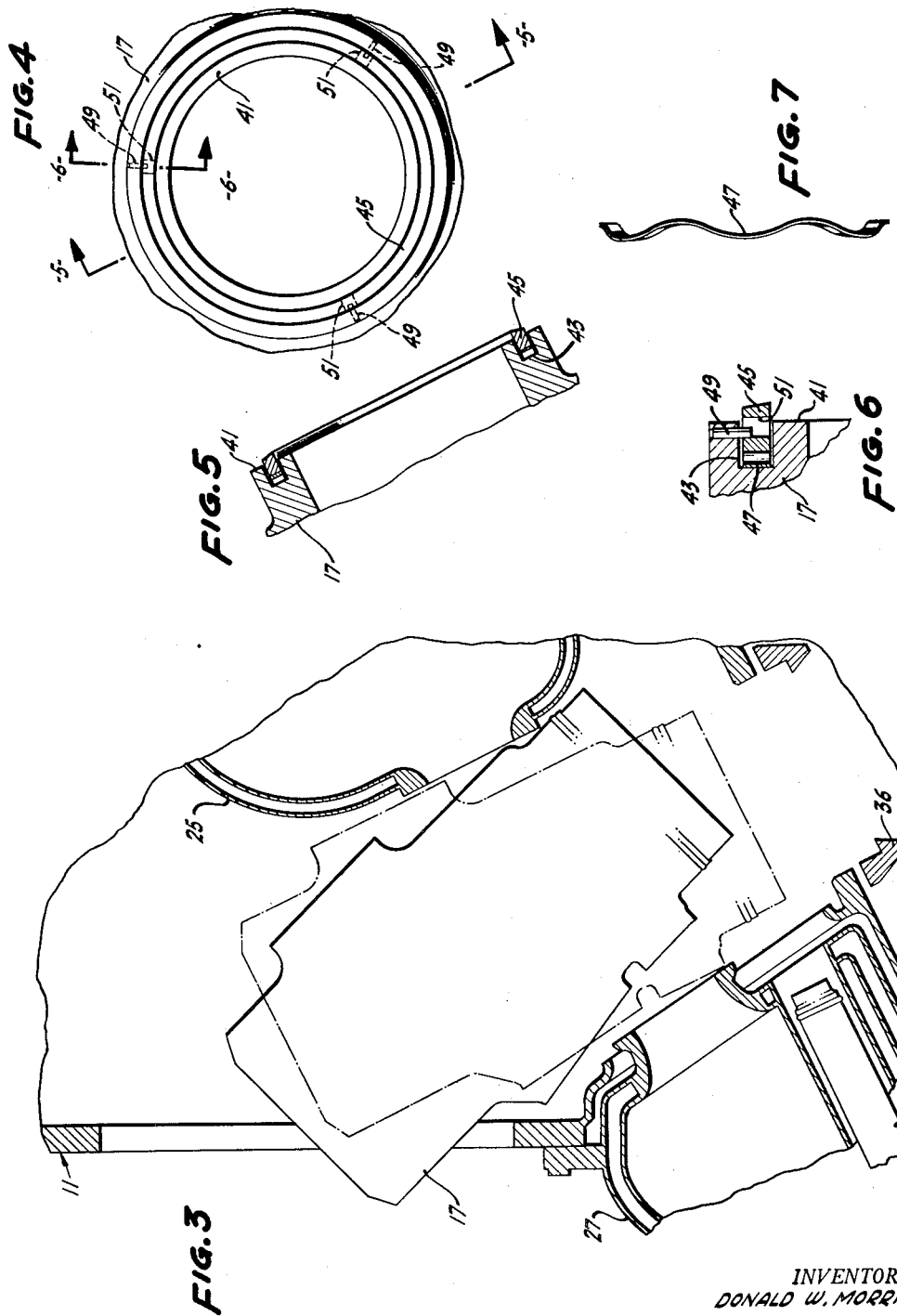
INVENTOR.
DONALD W. MORRIS
BY
Mellin and Hanscom
ATTORNEYS Jan. 17, 1956 D. W. MORRIS 2,731,003
INTERNAL-COMBUSTION ENGINE
Filed Feb. 23, 1952 4 Sheets-Sheet 4
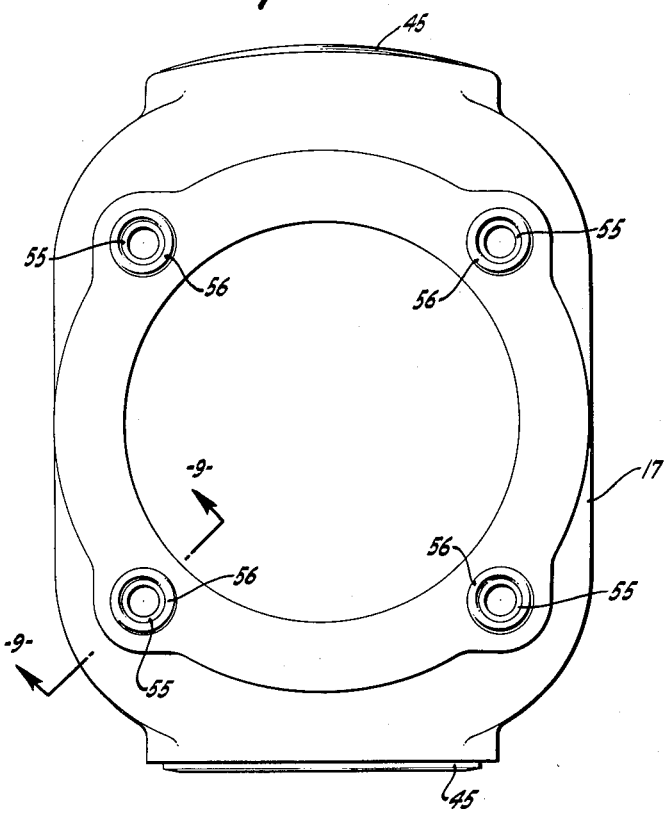
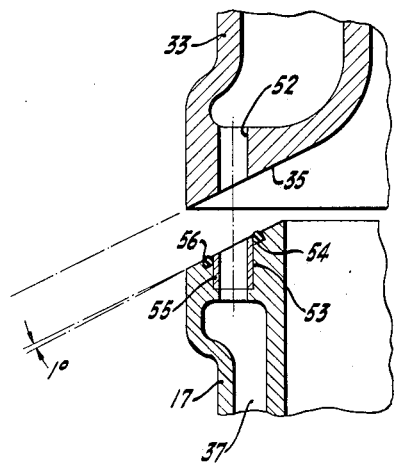
INVENTOR.
DONALD W. MORRIS
BY
Mellin and Hanscom
ATTORNEYS

United States Patent Office 2,731,003
Patented Jan. 17, 1956

2,731,003

INTERNAL-COMBUSTION ENGINE

Donald W. Morris, Berkeley, Calif., assignor to Morris Development Company, Los Angeles, Calif., a copartnership Application February 23, 1952, Serial No. 273,049

9 Claims. (Cl. 123—53)

This invention relates to internal combustion engines and particularly concerns improvements in the so-called opposed piston type of engine such as disclosed in my Patent No. 2,507,923, granted May 16, 1950, and entitled Internal Combustion Engine.

The concepts of the present invention find most advantageous practical application in diesel engines of relatively large bore construction such as engines having cylinder bores four inches or greater, although certain concepts of the present invention are not intended to be limited to large bore engines or to diesel engines.

In my prior patent, which particularly relates to engines of relatively small bore, there is disclosed an opposed piston engine of the diamond type so constructed that the cylinders thereof can be removed through openings in the sides of the framework without disturbing the crankshafts. The present invention relates to an engine of this general type.

In order to remove an elongated object, such as a cylinder, through an opening smaller than the length of the cylinder, it is apparent that an axial disposition of the cylinder relative to the opening is the logical removal position of the cylinder. However, in engines of the type under present consideration, a cylinder must necessarily be disposed at a substantial angle to the axis of the opening through which it is to be removed and, therefore, the cylinder is manipulated during removal to bring it to a position more nearly in axial alignment with the removal opening than it occupies in its operative position. In prior engines of this type, various stuctures necessarily provided in previous designs restricted removal manipulating movements of a cylinder so as to prevent a greater angular disposition of a cylinder relative to a removal opening.

It is a main object of the present invention to provide an engine of the diamond type so designed that the cylinders thereof can be manipulated during removal in a manner not heretofore possible.

It is a principal object of the present invention to provide an engine of the type generally described above having a greatly simplified block structure.

The concepts of the present invention contemplate an engine wherein the various movement-restricting structures above mentioned have been eliminated in the case of the inlet cylinders, and redesigned in the case of the exhaust cylinders, to make practical an engine design having a narrower diamond arrangement of the cylinders, and yet which cylinders because of their greater freedom of movement during removal can be easily removed, the inlet cylinders first and the exhaust cylinders second in the order of their degrees of freedom of movement.

To be more specific, my prior engine contemplated a water cooling arrangement wherein water passed over part of the exterior of an inlet cylinder, the other part being surrounded by inlet air which entered the cylinder through lateral ports formed in the walls thereof. To effect such an arrangement, an inlet cylinder was embraced at approximately the central portion thereof by a framework partition web which divided the exterior of the inlet cylinder into a part to be subjected to water and a part to be subjected to inlet air. This frame web obviously restricted movement of the inlet cylinder during removal thereof. In the present invention, a different water cooling arrangement is contemplated wherein the above mentioned framework web is eliminated to enable greater freedom of movement of the inlet cylinder during removal thereof.

In my prior engine, each exhaust cylinder was also embraced at approximately the central portion thereof by exhaust manifold structures formed with a cylindrical passage or bore to receive the exhaust cylinder. This design limited movement of an exhaust cylinder during removal thereof through a removal opening in the side of the framework. In the present invention, generally similar exhaust manifold structures are provided, but the exterior of an exhaust cylinder opposite the exhaust manifold structures is tapered and the manifold structures are complementally tapered, so that when the exhaust cylinder is partially withdrawn, it may be tilted in an amount commensurate with the amount of withdrawal thereof, to dispose the exhaust cylinder more nearly co-axial with the removal opening axis to permit ready removal thereof. This design permits a narrower diamond formation of the cylinders and a more laterally compact engine, yet allows ready removal of the cylinders.

Another object of the present invention is to provide an engine of the type generally described above in which the exhaust cylinder has flat circular seats surrounding lateral exhaust ports formed in the walls of the cylinder, thereby providing a seat construction which can be more easily machined than a cylindrical seat, such as provided in my prior construction.

In my prior engine, the water cooling system included a major portion of exterior surface of each exhaust cylinder as well as a part of the exterior surface of each inlet cylinder, the latter construction being previously mentioned. Although in my prior construction there were provided two large rubber O rings arranged concentrically of each exhaust cylinder, one on either side of the exhaust ports, for preventing water or exhaust gas leakage, there is inherent in this construction the possibility of water leakage past the sealing rings into the exhaust system, or exhaust gas leakage into the water system. It is also apparent that these rubber rings were subjected to the effects of the hot exhaust gases which caused deterioration of the rings at an undesirable rate.

It is a further object of the present invention to provide an engine having a water cooling arrangement including water passages formed in the walls of the cylinders with air space alone surrounding the exterior of each exhaust cylinder, so that any leakage past the sealing means disposed between the exhaust cylinder and the adjacent manifold structures is from the air space into the exhaust system, since the air space contains inlet air under pressure higher than that in the exhaust system. This leakage is obviously not harmful to the exhaust system and is of such a minor nature as not to be wasteful. Furthermore, since only an air seal is to be effected and slight leakage is not objectionable, such a design allows the use of metallic sealing rings which are not adversely affected by heat, or the use of other types of sealing means not adversely affected by heat, such as silicone O rings.

Another object of the present invention is to provide a water cooling system including passages in a cylinder head and communicating passages in a cylinder, said members being formed with mating seats having an angle differential therebetween so that the inner edges of the seats engage and seal off combustion pressures, and which seats have water-sealing O rings therebetween to separately seal off leakage of water laterally of the communicating passages.

A still further object of the present invention is to provide an engine having a novel water cooling arrangement to effectively cool the engine in a superior manner as compared to prior water cooling arrangements, and particularly such an arrangement for a diamond-type engine; to provide a water cooling arrangement having conduits or passageways detachably secured to the cylinders and removable to permit withdrawal of the cylinders; to provide such an arrangement in which an exhaust manifold structure has water passages formed in the walls thereof communicating with the passages of the cylinders; and to provide such an arrangement in which the exhaust manifold structures are removable from the framework without disturbing the mounting of the cylinders.

A further object of the present invention is to provide a novel manner of clamping a cylinder in place within and to the framework of the engine.

Various other objects of the present invention will be apparent from the following description taken in connection with the accompanying drawings wherein:

Fig. 3 is a view similar to Fig. 2 but showing the exhaust cylinder in the process of being removed;

Fig. 4 is a fragmentary view, taken along line 4—4 of Fig. 2, showing the sealing construction between the exhaust cylinder and an exhaust manifold structure;

Fig. 5 is a sectional view taken along line 5—5 of Fig. 4;

Fig. 6 is a sectional view taken along line 6—6 of Fig. 4;

Fig. 7 is a view of a spring for yieldably forcing a metallic sealing ring into sealing engagement with the associated seat;

Fig. 8 is a view of the head-end seat of one of the cylinders;

Fig. 9 is a sectional view taken along line 9—9 of Fig. 8.

Figure 1:
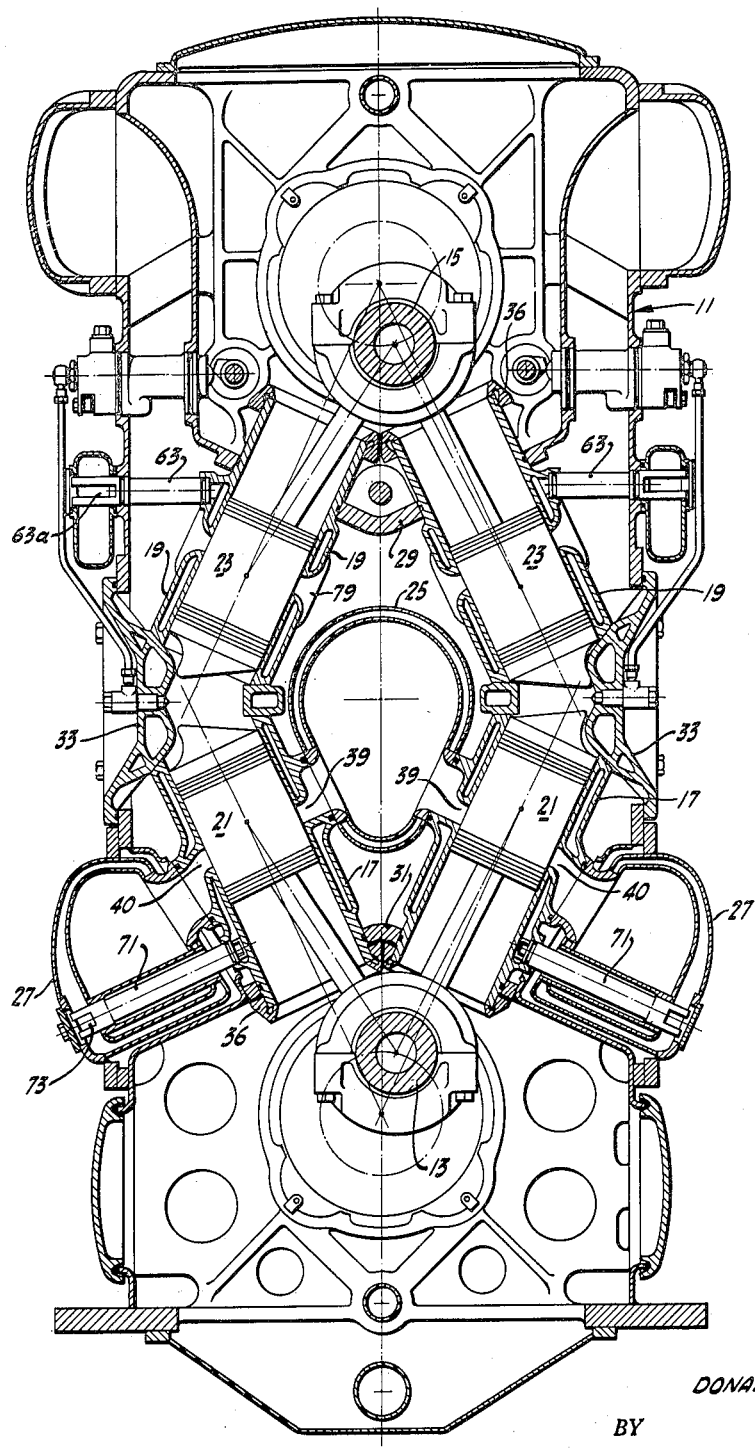
Fig. 1 is a vertical transverse section through a diamond-type diesel engine embodying the concepts of the present invention.

Referring to the accompanying drawings wherein similar reference characters designate similar parts throughout, the diamond-type engine disclosed includes a hollow framework, generally entitled 11, supporting in horizontal parallel fashion a pair of crankshafts 13 and 15, said crankshafts being connected to pistons 21 and 23, respectively, to be driven by the same. Pistons 21 and 23 are reciprocable within exhaust and intake cylinders 17 and 19, respectively, which cylinders are arranged in diamond formation as shown in Fig. 1 to provide angularly offset cylinders.

Figure 2:
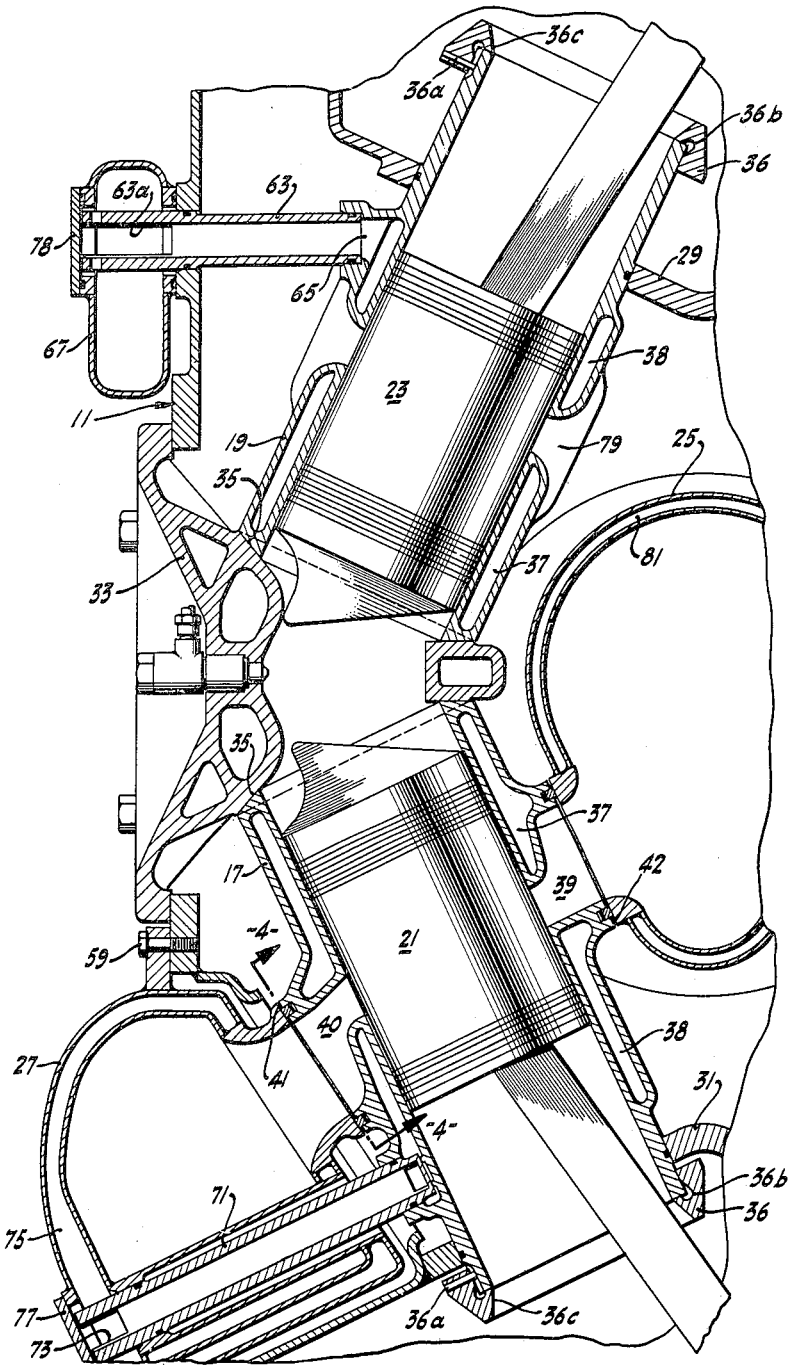
Fig. 2 is an enlarged fragmentary view of Fig. 1, showing one pair of opposed pistons and the associated structure.

Fig. 2 is an enlarged view of one bank or pair of angularly offset cylinders and the associated structure. Since the other pair of cylinders making up the diamond are identical in formation with the pair of cylinders and associated structure shown in Fig. 2, only the structure disclosed in Fig. 2 will be specifically described.

Removably mounted on the framework 11 are a pair of exhaust manifold structures 25 and 27 of which more will be said presently. Also formed in the framework 11 is an upper web 29 and a lower web 31. Webs 29 and 31, together with a removable cylinder head 33 which will be described presently, are formed to receive and support exhaust and intake cylinders 17 and 19.

Cylinders 17 and 19, when inserted into framework 11, are adapted to have their remote ends fit within clamping rings 36 which are mounted on webs 29 and 31 by bolts in a manner similar to that disclosed in my prior patent above identified. Rings 36 have guide pins 36a for disposing the cylinders in predetermined rotary positions relative to the other parts of the assembly.

It is pointed out that rings 36 bear directly against the remote end faces of the cylinders and therefore apply only an axial force to the cylinders. In my prior design, the rings engaged annular ribs formed on the exteriors of the cylinders adjacent the remote ends thereof, thereby applying a bending force to the cylinders to distort the inner surfaces thereof somewhat, especially at the location of the four holding bolts. In the present design, no bending forces are created and furthermore a large fillet is formed at 36b on each ring so that each ring may deflect a small amount at the four points of bolt-pressure to somewhat more uniformly distribute the bolt-pressure on the rings.

The present design also permits the rings to be interiorly tapered as at 36c to allow for a more ready insertion of a piston and its uncompressed piston rings within said remote ends of the cylinders, said tapered surfaces functioning to compress the piston rings during insertion.

Head 33 has an inwardly protruding structural portion formed with beveled seats 35, adapted after the head is secured in place and the clamping rings tightened down toward the webs to tightly engage the beveled seats formed on the head ends of the cylinders. Beveled seats 35 converge toward one another so as to tend to radially compress rather than radially expand the walls of the cylinders. The inward radial stresses thus set up tend to partially counteract the outward radial stresses created by combustion pressures. A stronger construction than disclosed in my prior patent is thus attained, because there the seats were arranged to radially expand the cylinder walls, and consequently the stresses set up by the combustion pressures were additive to the ones caused by the seat engagement.

In my patent above referred to, there was provided a water cooling arrangement including part of the exterior surfaces of the cylinders. A superior cooling arrangement is provided in the present invention by providing water passages 37 and 38 in the walls of cylinders 17 and 19 so as to achieve not only a water cooling of the cylinders for substantially the entire lengths thereof, which was not possible in my prior engine, but also to provide an air space surrounding the exterior surfaces of the cylinders.

Therefore the present water cooling design eliminates the movement-restricting framework partition web about the central portion of the inlet cylinder, and thus the inlet cylinder can be readily manipulated for easy withdrawal through the cylinder head opening, even though the cylinder is arranged in a more upright position than that assumed by the inlet cylinders of my prior construction. This freedom of movement enables the inlet cylinder to be first removed through the adjacent cylinder head opening past the head end of the adjacent exhaust cylinder, the exhaust cylinder being removed lastly because its movements are more closely restricted than those of the inlet cylinder.

Formed in the side walls of exhaust cylinder 17 are exhaust ports 39 and 40 communicating with passages or ports formed in manifold structures 25 and 27 respectively. Guide pins 36a serve to insure registry of the ports of the cylinder with the ports or passages in the manifold structures.

It is apparent from Fig. 2 that the joints or contacting surfaces between exhaust cylinder 17 and manifold structures 25 and 27 are surrounded by an air space and not by a water chamber as in my prior construction. Therefore, the possibility of water leakage into the exhaust system or exhaust gas leakage into the water system at these points is eliminated.

Referring to Figs. 4 through 7, it can be seen that there are flat circular seats 41 and 42 formed on cylinder 17 adjacent exhaust ports 39 and 40. These seats have circular grooves 43 formed therein receiving metallic sealing rings 45 beveled at their sealing edges for superior sealing engagement and spring urged outwardly of their grooves by circular corrugated metallic springs 47. The metallic sealing rings are retained against complete dislodgment from their grooves by a plurality of pins 49 receivable within closed slots 51 formed in the metallic sealing rings. As is apparent from Fig. 2 a suitable seal by sealing rings 45 is effected against flat seats provided on manifold structures 25 and 27. The air surrounding exhaust cylinder 17 and the exhaust manifolds is maintained at a higher pressure than that within the exhaust manifolds, and any leakage past the metallic rings will be in a direction into the exhaust manifolds, which action is not sufficient to be objectionable. A reversal of the above construction with the rings being mounted on the manifold structures is also possible but not as desirable as the construction shown.

It is pointed out that it is possible to provide metallic sealing rings at the above joints because these rings do not have to seal against water leakage as did the sealing means in the prior design. It is also contemplated that other types of heat-resistant sealing means, such as silicone rings, may be used in lieu of the metallic rings.

Another advantage to the construction shown in Fig. 2 is that by providing flat circular seats between the exhaust cylinder and the manifold structures, machining of the seats is made a relatively easy task, since it is obviously easier to machine a flat circular seat than it is an annular or cylindrical seat, such as disclosed in my prior construction.

Another extremely important concept of my present invention is shown in Fig. 2 wherein it is apparent that the plane containing seat 41 is disposed at an angle to the axis of cylinder 17, thereby providing a tapered cylinder-receiving manifold portion for cylinder 17. The importance of this construction is apparent when it is remembered that the cylinder 17 must be removed through the opening closed by a cylinder head 33. The above tapered construction allows a much more compact arrangement of the engine parts and a narrower diamond cylinder arrangement than allowed in a construction where the exterior of the cylinder is formed cylindrically concentric to the opposed surfaces of the exhaust manifold structures.

Exhaust cylinder 17 is readily removed after removal of cylinder head 33 and inlet cylinder 19, by moving it upwardly as the parts are depicted in Fig. 2 and then tilting the cylinder in an amount proportional to the degree of withdrawal. The amount of tilting allowed obviously increases as the cylinder is further withdrawn. Previous to this withdrawing movement, a certain element (to be described) of the water cooling arrangement must be detached from cylinder 17. Reference is had to Fig. 3, wherein there is shown in dot-dash and full lines exhaust cylinder 17 in two partly removed positions.

Both exhaust manifold structures 25 and 27 are removable without disturbing cylinders 17 and 19, manifold structure 27 being secured to the framework in an exposed position as shown in Fig. 2 by bolts 59, and internal manifold structure 25 being supported from the framework in a manner (not shown in the figures) such as to enable the same to be removed through the end of the hollow framework 11 opposite the end containing the crankshaft gear train (not shown).

It is apparent from Fig. 2 that after removal of cylinder head 33, manifold structure 25, if sectionalized, can also be removed through the openings closed by head 33. Such a sectionalized construction is contemplated in cases where end removal is not possible. Ready removal of the manifold structures allows them to be readily inspected and repaired, if necessary.

Another important feature of the present invention has been briefly referred to hereinbefore, that is, the water cooling arrangement. Passageways 37 and 38 are adapted to communicate with one another by the means of passages formed in the walls of the cylinder head 33. Referring to Figs. 8 and 9, passages 38 are shown opening through the cylinder seats at four places. Communicating with these passages are passages 52 formed in cylinder head 33 and communicating with passages 52 are passages 37 in cylinder 17.

Fig. 9 shows a preferable sealing arrangement between the cylinders and the cylinder head. For each passage there is a first counter-bore 53 and a second shallow counter-bore 54, counter-bore 53 receiving a ferrule 55 to provide an upstanding rim to support or contain an O ring 56 which is adapted to sealingly engage beveled seats 35 formed on cylinder head 33.

The opposed seats of each cylinder and the cylinder head have an angle differential therebetween so that the inner surfaces of the cylinder seats first engage the opposed cylinder head seats to seal off escape of combustion pressures past the seats and therefore prevent any substantial contact between the hot combustion gases and O rings 56. This type of seat design also compensates for slight misalignment of the cylinders and cylinder head as well as for distortions due to temperature effects and mechanical stresses.

For conducting water away from passages 38 of cylinder 19, there is provided a removable conduit 63 sealingly engaging a port 65 formed in cylinder 19, said port communicating with passages 38. The sealing arrangement preferably takes the form of an O ring clearly shown in Fig. 2. The outer end of conduit 63 sealingly engages hollow framework 11 as shown in Fig. 2, the extreme outer end of the conduit being formed with slots 63a to allow for the passage of water into a chamber structure 67, the latter being removably secured to and on the exterior of framework 11, chamber structure 67 being in communication with a header which communicates with the low pressure side of a water pump, not shown.

Water flows to passages 37 in the walls of exhaust cylinder 17 from a removable water conduit 71 which sealingly engages cylinder 17 at its inner end as shown in Fig. 2 and sealingly engages the exhaust manifold 27 at its outer end. The outer end of the conduit has slots 73 for allowing water to pass from passages 75 formed in the walls of exhaust manifold structure 27, into conduit 71. Passages 75 are in direct communication with the high pressure side of a pump (not shown). Passages 81 are formed in the walls of internal exhaust manifold 25 and are in communication with the water pump.

It is apparent that the water flow is upward through the engine and with the present design, no air or steam will be trapped in the water system, thereby avoiding the creation of hot spots at improperly heated places.

In order to remove either cylinder 17 or 19, conduits 71 and 63, respectively, must be removed as shown in the case of conduit 71 in Fig. 3. This removal is, of course, relatively easy since all that is necessary is to remove a cover 77 removably attached to the exhaust manifold 27, as shown in Fig. 2 in the case of conduit 71, or a cover 78 for chamber structure 67 in the case of conduit 63.

While I have shown the preferred form of my invention, it is to be understood that various changes may be made in its construction by those skilled in the art without departing from the spirit of the invention as defined in the appended claims.

Having thus described my invention, what I claim and desire to secure by Letters Patent is:

1. In an internal combustion engine of the type including a hollow framework having pairs of opposing intake and exhaust cylinders arranged in a diamond formation therein, each cylinder having a head engaging portion upon the end adjacent the opposing cylinder, and said framework having openings in the sides adjacent the head ends of each pair of cylinders of a size to pass a cylinder, a cylinder head removably closing each of said openings, exhaust manifold structures embracing the exhaust cylinders, opposed faces on the manifold structures and the exhaust cylinders generally tapered to permit tilting of the exhaust cylinders for removal thereof through the opening.

2. In an internal combustion engine of the type including a hollow framework having pairs of opposing intake and exhaust cylinders arranged in a diamond formation therein, each cylinder having a head engaging portion upon the end adjacent the opposing cylinder, and said framework having openings in the sides adjacent the head ends of each pair of cylinders of a size to pass a cylinder, a cylinder head removably closing each opening and having inwardly beveled seats engaging correspondingly beveled seats provided upon the head ends of the adjacent opposing cylinders, said beveled seats converging coaxially with the cylinder toward points within the cylinder head, the point toward which the beveled faces of each cylinder converges being spaced from the head engaging end of its opposed cylinder, whereby the walls of the cylinders are radially inwardly compressed by such engagement.

3. In an internal combustion engine of the type including a hollow framework having pairs of opposing intake and exhaust cylinders arranged in a diamond formation therein and provided with adjacent head engaging ends, said framework having openings in the sides adjacent the head engaging ends of each pair of cylinders of a size to permit a cylinder to pass therethrough, a cylinder head removably closing each opening and having seats converging inwardly of the head and engaging mating seats formed on the head ends of the adjacent cylinders, each pair of mating seats having an angle of convergence differential therebetween so that the engagement between the seats of each pair takes place at inner portions thereof.

4. In an internal combustion engine of the type including a hollow framework having pairs of opposing intake and exhaust cylinders arranged in a diamond formation therein and provided with adjacent head engaging ends, said framework having openings in the sides adjacent the head engaging ends of each pair of cylinders of a size to permit a cylinder to pass therethrough, a cylinder head removably closing each of said openings, said framework having an air chamber formed therein enclosing substantially the entire exteriors of the inlet cylinders, and providing clearance around the intake cylinders sufficient to permit them to be manipulated within the air chamber into positions for ready extraction through the framework openings, and intake passages in the walls of the intake cylinders communicating with the air chamber.

5. In an internal combustion engine of the type including a hollow framework having pairs of opposing intake and exhaust cylinders arranged in a diamond formation therein and provided with adjacent head engaging ends, said framework having openings in the sides adjacent the head engaging ends of each pair of cylinders of a size to permit a cylinder to pass therethrough, a cylinder head removably closing each of said openings, exhaust manifold structures embracing the exhaust cylinders, the exhaust cylinders having exhaust ports formed in the walls thereof in communication with ports formed in the exhaust manifold structures and having outwardly extending flat circular seats machined thereon opposing mating flat circular seats machined on the manifold structures, the plane of said mating circular seats being inclined to the axis of said exhaust cylinders.

6. In an internal combustion engine of the type including a hollow framework having pairs of opposing intake and exhaust cylinders arranged in a diamond formation therein and provided with adjacent head engaging ends, said framework having openings in the sides adjacent the head engaging ends of each pair of cylinders of a size to permit a cylinder to pass therethrough, a cylinder head removably closing each of said openings, exhaust manifold structures embracing the exhaust cylinders, the exhaust cylinders having exhaust ports formed in the walls thereof in communication with ports formed in the exhaust manifold structures and having outwardly extending flat circular seats machined thereon opposing mating flat circular seats machined on the manifold structures, and sealing rings between the flat circular seats, the plane of said mating circular seats being inclined to the axis of said exhaust cylinders.

7. In an internal combustion engine of the type including a hollow framework having pairs of opposing intake and exhaust cylinders arranged in a diamond formation therein and provided with adjacent head engaging ends, said framework having openings in the sides adjacent the head engaging ends of each pair of cylinders of a size to permit a cylinder to pass therethrough, a cylinder head removably closing each of said openings, said framework also having an air chamber formed therein enclosing substantially the entire exteriors of the inlet and exhaust cylinders and providing clearance around the intake cylinders sufficient to permit them to be manipulated within the air chamber into positions for ready extraction through the framework openings, intake passages in the walls of the intake cylinders communicating with the air chamber, exhaust manifold structures embracing the exhaust cylinders, opposed faces on the manifold structures and the exhaust cylinders generally mutually tapered to permit tilting of the exhaust cylinders for removal thereof through the opening.

8. In an internal combustion engine of the type including a hollow framework having pairs of opposing intake and exhaust cylinders arranged in a diamond formation therein and provided with adjacent head engaging ends, said framework having openings in the sides adjacent the head engaging ends of each pair of cylinders of a size to permit a cylinder to pass therethrough, a cylinder head removably closing each of said openings, said framework also having an air chamber formed therein enclosing substantially the entire exteriors of the inlet and exhaust cylinders and providing clearance around the cylinders sufficient to permit them to be manipulated within the air chamber into positions for ready extracting through the framework openings, intake passages in the walls of the intake cylinders communicating with the air chamber, exhaust manifold structures embracing the exhaust cylinders, opposed faces on the manifold structures and the exhaust cylinders inclined to the axis of said exhaust cylinders to permit tilting of the exhaust cylinders during removal thereof, the exhaust cylinders having exhaust ports formed in the walls thereof in communication with ports formed in the exhaust manifold structures and having outwardly extending flat circular seats machined thereon opposing flat circular seats machined on the manifold structures.

9. In an internal combustion engine of the type including a hollow framework having pairs of opposing intake and exhaust cylinders arranged in a diamond formation therein and provided with adjacent head engaging ends, said framework having openings in the sides adjacent the head engaging ends of each pair of cylinders of a size to permit a cylinder to pass therethrough, a cylinder head removably closing each opening and having seats, converging inwardly at the head and engaging mating seats formed on the head ends of the adjacent cylinders, each pair of mating seats having an angle of convergence differential therebetween so that the engagement between the seats of each pair takes place at the inner portions thereof, a clamping ring engaging the remote end face of each cylinder, and means for forcing the clamping rings toward their associated cylinder heads by pressure applied in an axial direction against the end faces of the cylinders to cause tight engagement between the cylinders and cylinder heads.

(References on following page)

References Cited in the file of this patent

UNITED STATES PATENTS

| | | |
|---|---|---|
| 584,921 | Capitaine | June 22, 1897 |
| 1,173,105 | Fekete | Feb. 22, 1916 |
| 1,330,409 | Taylor | Feb. 10, 1920 |
| 1,359,598 | Holthaus | Nov. 23, 1920 |
| 1,383,367 | Wygodsky | July 5, 1921 |
| 1,816,819 | Austin | Aug. 4, 1931 |
| 1,968,110 | Walker | July 31, 1934 |
| 2,049,631 | Stearns | Aug. 4, 1936 |
| 2,056,056 | Stearns | Sept. 29, 1936 |
| 2,056,057 | Stearns | Sept. 29, 1936 |
| 2,144,706 | Pescara | Jan. 24, 1939 |
| 2,507,923 | Morris | May 16, 1950 |

FOREIGN PATENTS

| | | |
|---|---|---|
| 488,916 | Great Britain | July 15, 1938 |